United States Patent [19]

Fieni

[11] 3,847,367
[45] Nov. 12, 1974

[54] SAFETY BELT REEL WITH BRAKE
[75] Inventor: Walter Fieni, Paris, France
[73] Assignee: Societe Anonyme Francaise Du Ferodo, Paris, France
[22] Filed: Mar. 26, 1973
[21] Appl. No.: 345,121

[30] Foreign Application Priority Data
Mar. 27, 1972 France .............................. 72.10664

[52] U.S. Cl. ......... 242/107.4, 188/82.4, 280/150 SB
[51] Int. Cl. ............................................. B65h 75/48
[58] Field of Search ........... 242/107.4, 107.2, 107.3, 242/107.5, 107.6, 107.7, 107 SB; 297/386, 387, 388; 280/150 SB; 188/82.4

[56] References Cited
UNITED STATES PATENTS

| 3,323,749 | 6/1967 | Karlsson | 242/107.4 |
| 3,347,488 | 10/1967 | Quinting | 242/107.4 |
| 3,510,085 | 5/1970 | Stoffel | 242/107.4 |
| 3,511,450 | 5/1970 | Aweimrine | 242/107.4 |

Primary Examiner—Billy S. Taylor
Attorney, Agent, or Firm—Walter M. Rodgers

[57] ABSTRACT

Strap reeling device, particularly for a safety belt strap, comprises a frame, a rotary shaft to which is attached one extremity of the strap and which is subjected to the action of a return spring biasing said strap to wind in, a wheel mounted on the shaft to immobilize the shaft in the direction corresponding to paying out of the strap, said wheel comprising locking teeth suitable for cooperating with matching teeth provided on the frame, together with wheel stop means arranged to arrest axial movement of the wheel. Said stop means comprises a dog rotatably mounted on the frame, interposed between the latter and the wheel, said dog being biased by a spring to cooperate with cam means integral with the wheel which withdraws the dog from the axial path of the wheel when the shaft rotates in the direction corresponding to the winding in of the strap.

8 Claims, 14 Drawing Figures

SAFETY BELT REEL WITH BRAKE

The present invention relates to a strap reeling and unreeling device, particularly intended for a safety belt strap and, more particularly, to such a device with automatic locking means, i.e., wherein after a suitable length of strap has been reeled out and when the belt is positioned about a user's body, any further length of strap is prevented from being reeled out so that the device is suitable, without requiring any other means, for performing its function of holding the user's body strapped in his seat in the event of accident.

Reeling and unreeling devices according to this invention have the advantage that they may be given any orientation within a vehicle to which they are fitted due to the locking action which becomes effective after a certain length of strap is reeled out and which is not responsive to vehicle impact, unlike reeling devices wherein the strap can be constantly fed from the supply means when the vehicle is travelling under normal conditions and wherein the strap reel means lock only if the vehicle sustains an impact.

In known reeling devices of the type to which the invention relates, which may be used in particular, for safety belts for the rear seats of automobile vehicles, the unreeling means are generally locked by means of a ratchet wheel, or similar device, which is prevented from rotating in the belt feed direction after a certain length of strap, determined by a feeler, has been extracted from the supply means. They then have the drawback of poor reliability owing to the varying degrees to which the strap coils are tightened when reeled in which variations render the feeler action variable and inconsistent.

In addition, friction means are used in these known devices to actuate the means for preventing the ratchet wheel from rotating in the desired direction. Consequently, certain components wear rapidly, thus rendering the unit non-operational very shortly after going into service.

One general purpose of the invention is to provide a reeling device, particularly designed for the strap of a safety belt of the above mentioned type which remedies the drawbacks of known devices.

It is also a purpose of the invention to provide a device of this type that operates reliably and without objectionable inconsistency, which is compact in size and hence particularly suitable for use in conjunction with safety belts, particularly automobile vehicle belts, designed for fitting either to the front or rear seats of these vehicles.

The strap reel device according to the invention, particularly for a safety belt, in one form may comprise a frame, a rotary shaft on which is mounted one extremity of the strap and which is biased by a return spring tending to reel in said strap, a wheel mounted on the shaft to immobilize the shaft against rotation in the direction corresponding to strap feed, the wheel having locking teeth suitable for engaging matching teeth provided on the frame of the device in response to axial movement of the wheel toward the matching teeth on the frame, together with axial stop means comprising a dog rotatably mounted on the frame and arranged to be interposed between the frame and the wheel so as to prevent locking of the wheel, said dog being biased by a spring to cooperate with camming means integral with the wheel that engages and moves the dog from the axial path of the wheel when the shaft completes rotation in the strap feed direction and briefly reverses rotation to allow the wheel and shaft to become locked to the frame.

According to another feature of the invention, the device comprises a button for operation which is slidably mounted with respect to the frame and which is axially linked to the wheel.

The invention may be fully understood by virtue of the following description given for the purposes of example when considered in conjunction with the attached drawings wherein.

With reference now to FIGS. 1 to 6, the strap reeling device according to the invention comprises a frame constituted by a plate 10, pierced by a hole 11 for mounting on a support, for example, an upright or the flooring of a vehicle and flanges 12 and 13 having apertures 14 and 15 respectively for receiving a cylindrical shaft 16 having a central portion 17 to which is attached one extremity of the strap.

The central portion 17 of shaft 16 is extended by a portion 18 in which are provided flat surfaces 19 and 20 (FIG. 3), which are extended by a threaded end portion 21 with a smaller diameter. Opposite portion 18, portion 17 is extended, beyond a shoulder 22, by an annular sleeve 23 having slots 24 and 25 (FIGS. 1 and 5) and lodging a strap pin 26. One of these slots, for example slot 25, houses the extremity 27 of a coil spring 28. The other extremity of spring 28 is attached in a cavity 29 in wall 30 of a housing 31, attached to the flange 13 and having an opening 32 blocked by a plug 33.

A second housing 34 is suitable for cooperating with the flange 12 of the frame 10 (FIGS. 2, 3 and 4), this housing being of plastic and being attached to the flange 12 by inserting a projection having a slit 37 into an opening 38 formed in flange 12 to form a pressure fit which takes advantage of the elastic property of housing 34.

On face 40 of the flange 12, opposite housing 34, projections 41A, 41B, 41C, 41D, 41E, 41F are uniformly distributed angularly about the longitudinal axis 35 of the device, these projections having, viewed from the top, a quadrangle contour with arcuate opposite edges 42A and 42B interconnected by rectilinear edges 43A and 44A. The flange 12 also bears a dog or pawl 46 rotatably mounted about a pin 45 which is integral therewith (FIGS. 3 and 4), biased by a spring 47 attached to a pin 48 on the flange 12 and constantly tending to swing said dog 46 in the direction of arrow P. Pivot 45 for dog 46 is disposed in spaced relationship to teeth 41 as shown in FIG. 4 which is such as to accommodate necessary movement of dog 46.

Figure 1:
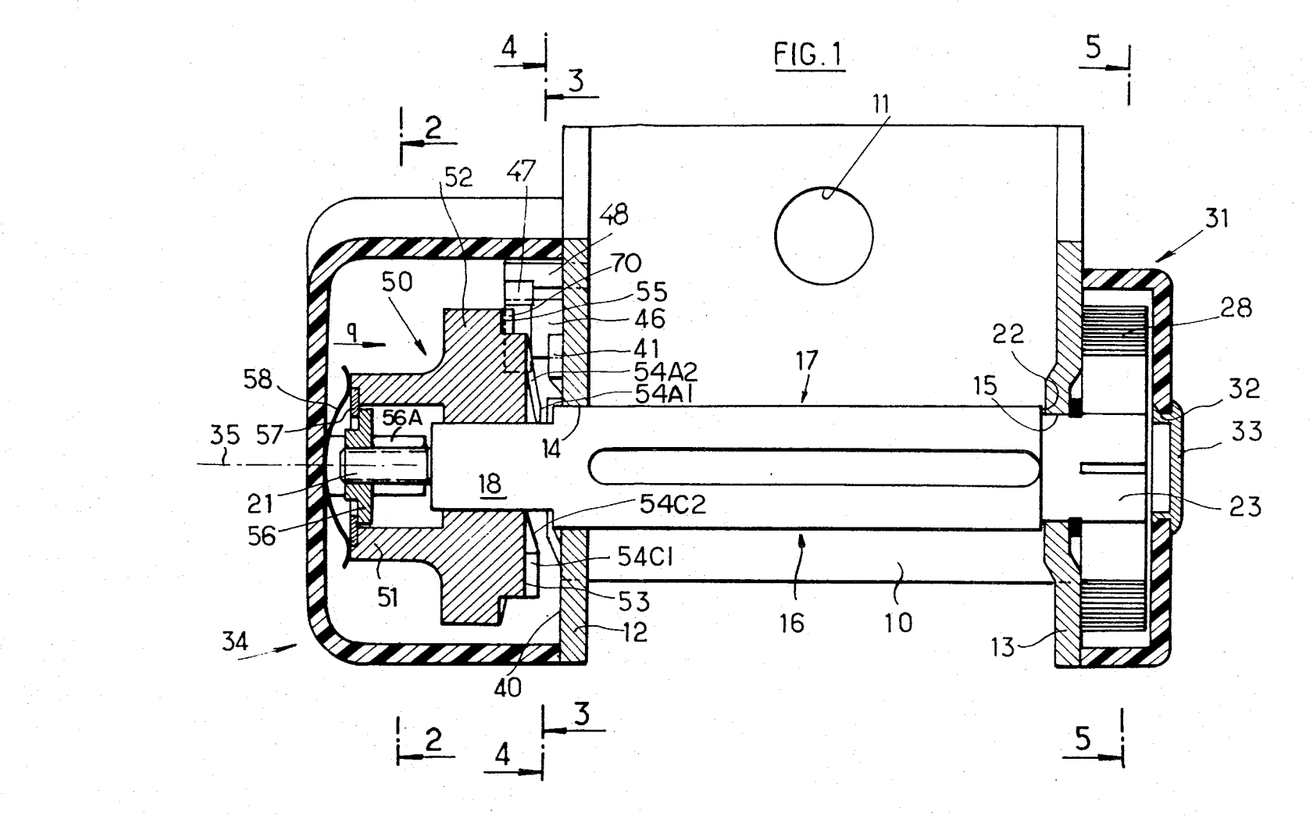
FIG. 1 is a longitudinal cross-sectional view taken along line 1—1 of FIG. 3, one embodiment of a reeling device constructed according to the invention.
Figure 2:
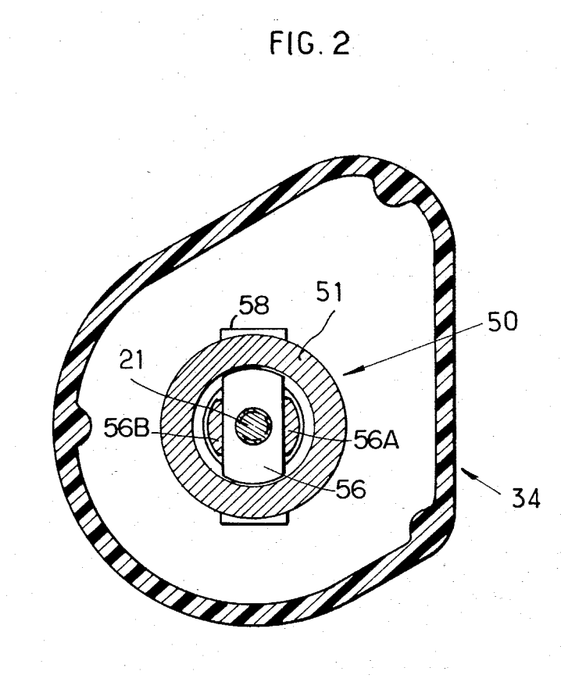
FIG. 2 is a cross-sectional view taken along line 2—2 of FIG. 1.
Figure 3:
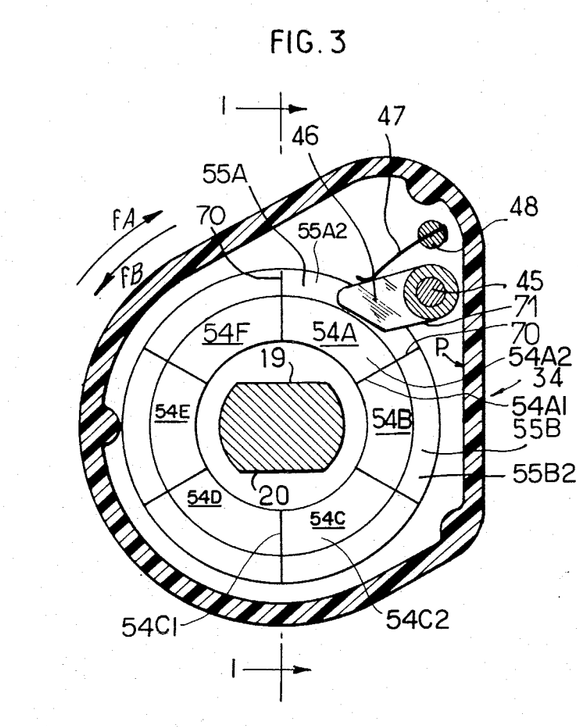
FIG. 3 is a cross-sectional view taken along line 3—3 of FIG. 1.
Figures 4, 6:
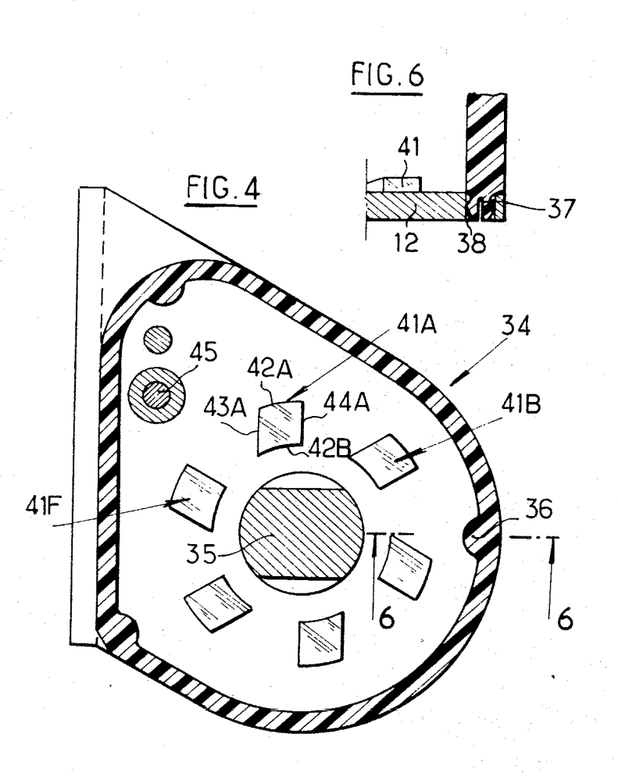
FIG. 4 is a cross-sectional view taken along line 4—4 of FIG. 1.
FIG. 6 is a cross-sectional view taken along line 6—6 of FIG. 4.
Figure 5:
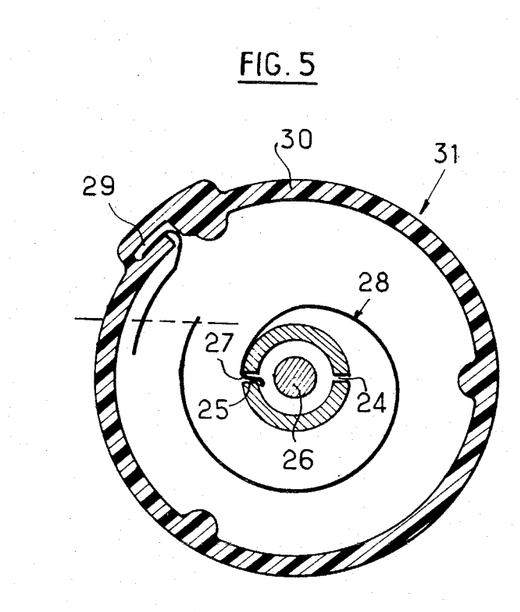
FIG. 5 is a cross-sectional view taken along line 5—5 of FIG. 1.

A wheel 50 is slidably mounted on portion 18 of the shaft 16 and is prevented from rotating on the shaft by flat surfaces 19 and 20 (FIGS. 1 and 3). This wheel comprises a small diameter tubular sleeve 51 and a larger diameter portion 52 whose face 53, opposite face 40 of flange 12 bears teeth 54A, 54B, 54C, 54D, 54E and 54F uniformly distributed angularly about the pin 35. As is apparent from FIGS. 1 and 3, the tooth 54A is formed with a surface 54A1 which is substantially normal to face 53 and with a surface 54A2 which is inclined to face 53. Similarly tooth 54C is formed with a surface 54C1 which is substantially normal to face 53 and with a surface 54C2 which is inclined to face 53. The other teeth 54B, 54D, 54E and 54F are similarly constructed and all these teeth become thicker in a clockwise direction as viewed in FIG. 3. The same number of teeth 55A, 55B, 55C, 55D, 55E, 55F, with the same angular spacing as the latter being provided about the periphery of the portion 52 of the wheel 50.

As is apparent from FIGS. 1 and 3 tooth 55B is formed with a portion 70 which is substantially normal to face 53 and with a portion 55B2 which is inclined to face 53, the surfaces 70 and 55B2 intersecting at edge 70 as viewed in FIG. 3. Thus it is apparent that tooth 55B becomes gradually thicker in a counter-clockwise direction as viewed in FIG. 3. The teeth 55A, 55C, 55D, 55E and 55F are similarly constructed.

In the recess of the sleeve 51 is housed a nut 56 cooperating with the threaded portion 21 of the shaft 16 and also suitable for cooperating with a flange 57 integral with the wheel 50 at the extremity of its portion 51. A leaf spring 58 attached to the housing 34 bears against flange 57 and constantly tends to bias the wheel in the direction of arrow q, (FIG. 1). Nut 56 is held against turning by probes 56A and 56B which are secured to housing 34 and which constitutes holding means.

The device according to the invention functions as follows:

In the initial state, as represented in the drawings, dog 46 is interposed between surface 53 of wheel 50 and flange 12 and the strap is wound on shaft 16 and, by drawing on its free end, it can be pulled from the supply device driving shaft 16 in rotation in the direction of arrow fA (FIG. 3) against the bias of armed coil spring 28 which constantly tends to reel in the strap. The rotation of shaft 16 causes the non-rotary nut 56 to describe a translation movement in the direction of arrow q separating it from the flange 57 integral with the wheel 50 which is biased by spring 58 toward flange 12, but is maintained at a distance therefrom by dog 46. As dog 46 rides over teeth 55, a slight oscillatory movement is imparted to wheel 50 due to engagement of dog 46 with teeth 55.

When a sufficient length of strap has been extracted from the supply device and there is no longer a tensile stress on the strap, it tends to be reeled in by spring 28, i.e., the spring tends to rotate shaft 16 in the direction of arrow fB. After at least a sixth of a turn of wheel 50 in the direction of arrow fB, in the six-tooth form of embodiment, the face 70 of one of said teeth 55 comes into contact with the face 71 of finger 46 and the latter is withdrawn by pivoting about pin 45, in the opposite direction to that indicated by arrow P. Wheel 50 is biased by spring 58 until its teeth 54 engage with projections or teeth 41 of face 40 of flange 12. In this state, the rotation of shaft 16 in the direction of arrow fA, corresponding to the strap feed direction is prevented; the reeling device pay-out is locked.

When the extremity of the strap unattached to the shaft is released, starting from the state above mentioned, for example when a safety belt to which the device is fitted opens, spring 28 which has previously been armed causes shaft 16 to rotate in the direction of arrow fB, this rotation being enabled by the appropriate configuration of the projections 41 of the flange 12 and teeth 54 of wheel 50; nut 56 is displaced in the opposite direction to that represented by the arrow q, driving with it, advantageously near the end of its movement, wheel 50, by bearing on flange 57 which is integral therewith. Immediately face 53 of wheel 50 is separated from face 40 of flange 12, by a distance greater than the thickness of finger 46, the latter which is biased by spring 47 pivots in the direction of arrow P in order to be interposed again between flange 12 and face 53 of wheel 50; the device is once again in the initial state.

With reference now to FIGS. 7 to 13 concerning another embodiment of a strap reeling device comprising means enabling either the strap to be paid out from the reel to enable the user's body to move forward or to lock the device both for winding the strap or unwinding it, so that the safety belt equipped with such a device is suitable for performing its function of maintaining the user in the event of an accident, but without tending to constantly press said user against his seat.

Figure 9:
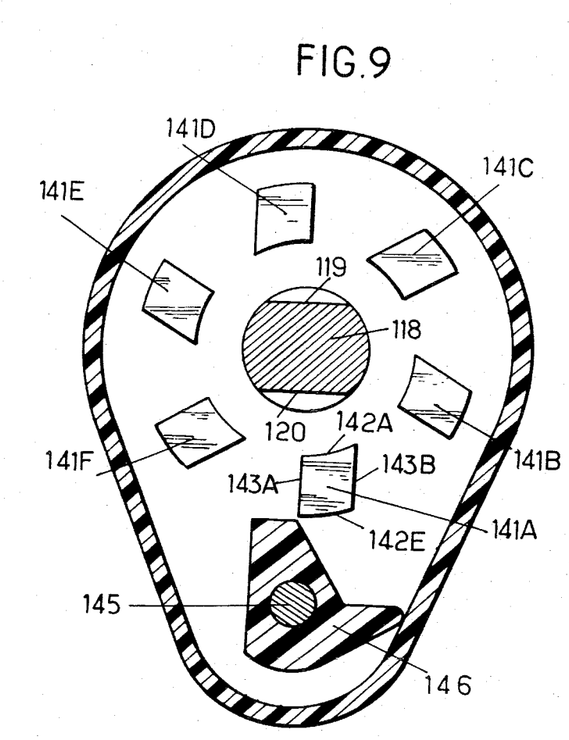
FIG. 9 is a cross-sectional view taken along line 9—9 of FIG. 7.

In this embodiment, the device comprises flanges 112 and 113 integral with a base, not represented, having openings 114 and 115 respectively for mounting a cylindrical shaft 116 having a central portion 117 to which is attached one extremity of the strap. The portion 117 of shaft 116 is extended at one extremity by a portion 118 on which are provided flat surfaces 119 and 120. FIG. 9, said portion 118 being continued by a smaller diameter threaded portion 121. Opposite its portion 118, shaft 116 having a shoulder 122 and an annular sleeve 123 having slots; one of which is represented at 124, to house the extremity of a coil spring 128 whose other extremity is attached to a housing built into the flange 113.

Figure 13:
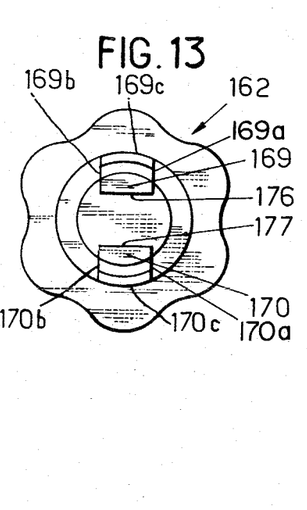
FIG. 13 is an end view of said displacement means, in the direction of arrow A of FIG. 12.

A second housing 134 is attached to the flange 112, with its face 160 remote from flange 112 forming a collar 161 for mounting and guiding, in reciprocatory and rotary movement, a knob 162 with an operating head 162a and a body 162b extended, (FIG. 12) after a groove 162c, by two diametrically opposed legs 169 and 170 each comprising a plane face 176 and 177 respectively turned towards axis 135 of the device. Transverse notches 171 and 172 (FIGS. 12 and 13) are formed on each of the legs. Between body 162 and notches 171, 172, each leg has an enlarged portion with a quadrangular cross-section delimited, in the case of leg 169, by face 176, longitudinal plane faces 169a, 169b, and a curved outer face 169c and, in the case of leg 170, by face 177, longitudinal plane faces 170a, 170b and a curved outer face 170c (FIG. 13).

Face 140 of flange 112 opposite housing 134 bears projecting members 141A, 141B, 141C, 141D, 141E, 141F, uniformly angularly distributed about the axis 135 of the device, these projecting members viewed from above having a quadrangular contour with opposite circular edges 142A and 142B interconnected by rectilinear edges 143A and 143B (FIG. 9). In housing 134 and adjacent to flange 112, a dog or finger 146 is rotatably mounted about a pin 145 integral therewith and journalling at its extremities in a recess of flange 113 and in a sleeve 163 of wall 160; a spring 147, FIG. 8, biases said dog or finger and constantly tneds to pivot said dog in the direction of arrow P which is that corresponding to strap feed direction.

Figure 7:
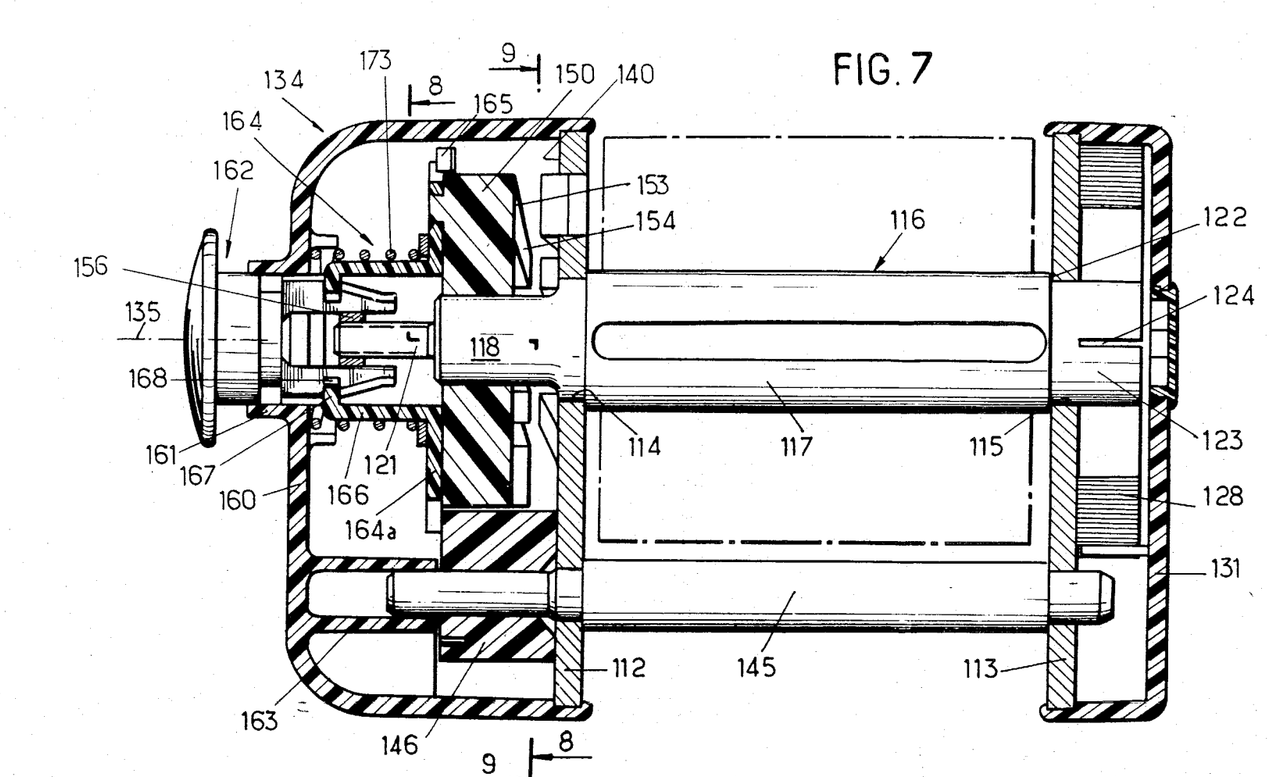
FIG. 7 is a view analogous to that of FIG. 1 for another embodiment of the invention.

A wheel 150, FIG. 7, is slidably mounted on portion 118 of shaft 116 but is prevented from rotating by members 119 and 120. The face 153 of said wheel opposite face 140 of flange 112 bears teeth 154, uniformly angularly distributed about axis 135. A cap 164 is integral with wheel 150 and its annular base 164a adjacent to wheel 150 bears camming elements in the form of teeth 165A, 165B, 165C, 165D, 165E, 165F on its periphery, said teeth being uniformly angularly distributed about axis 135, and being disposed to engage dog 146, said base being extended by a sleeve 166 constituting the body of toothed cap 164 whose bottom 167 provides an opening 168 in which legs 169 and 170 of knob 162 engage. This knob, which is made integral in translation along axis 135 of wheel 150 by the toothed cap 164 wherein the edges of opening 168 cooperate with notches 171 and 172 of legs 169 and 170, can be rotated relative to said cap which is constantly biased away from wall 160 of housing 134 by a spring 173 bearing against said wall, on one hand, and against base 164a, on the other hand, in order to tend to bias wheel 150 against flange 112.

Figure 14:
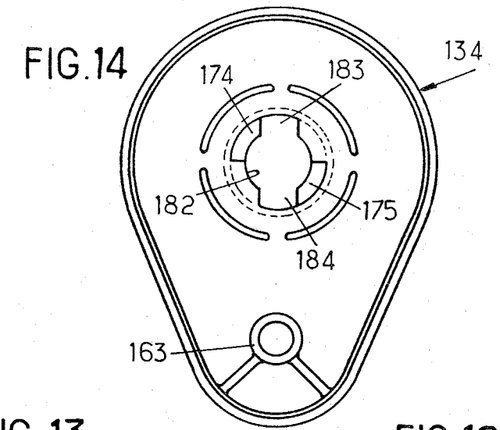
FIG. 14 is an elevation view of the interior of a housing of the device represented in FIGS. 7 and 10.

The internal orifice 182 of collar 161, FIG. 14, is generally circular with two diametrically opposed portions 183 and 184 whose cross-section matches that of the enlarged portions of legs 169 and 170 of knob 162, these portions being bordered by two ribs 174 and 175 forming an arc of a circle provided on the inner face of wall 160.

Figure 8:
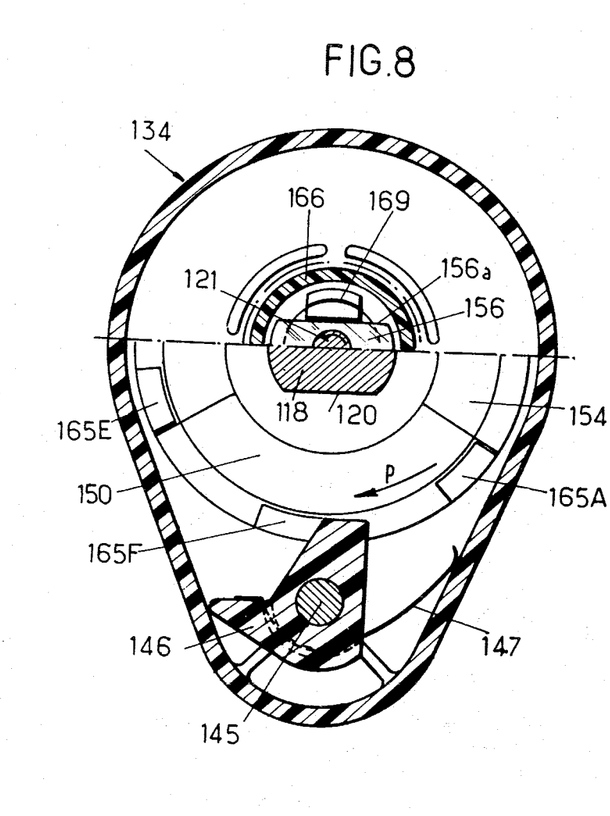
FIG. 8 is a cross-sectional view taken along line 8—8 of FIG. 7.

Inside legs 169 and 170 of knob 162, whose rotation is limited by ribs 174 and 175, is housed a nut 156 cooperating with the threaded portion 151 of shaft 116, said nut having lateral faces shaped to form two members 156a, FIG. 8, cooperating with the plane faces 176 and 177 of knob 162 legs 169 and 170.

Figure 11:
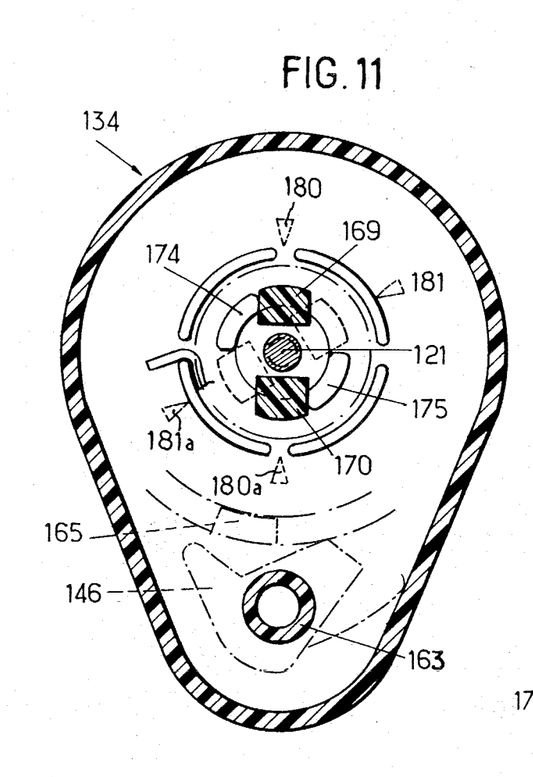
FIG. 11 is a cross-sectional view taken along line 11—11 of FIG. 10.
Figure 12:
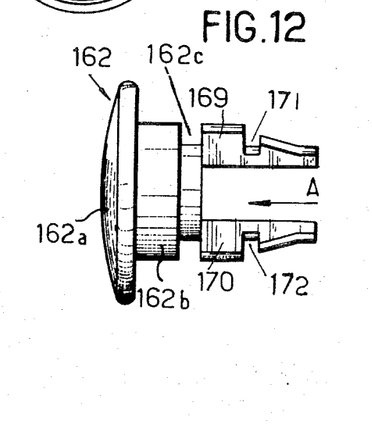
FIG. 12 is an elevation view of displacement means according to the invention.

As long as knob 162 is adjacnt to wall 160 of housing 134, on the one hand, and as long as guide marks on head 162a are, on the other hand, opposite two index marks 180 and 180a of housing 134, FIG. 11, the device functions in an analogous manner to that of the previous embodiment, i.e., the strap can be pulled out from the supply device by drawing its free extremity; when a tensil stress is no longer applied to the strap, a sufficient length having been drawn from the device, this causes the device to be locked against pay-out by the engagement of teeth 154 of wheel 150 and teeth 141 of flange 112.

When, starting from the locked position of the device, it is desired to enable the strap to be paid out, knob 162 is displaced away from housing 134, FIG. 7, thus driving the toothed cap 164 and wheel 150 integral therewith away from flange 112, against the bias of spring 173; dog 146 falls and maintains wheel 150 in a position where its teeth 154 are at a distance from teeth 141 of flange 112; shaft 116 is free to rotate and the strap is allowed to be unreeled. As soon as reeling-in of the strap takes place, the dog 146 is withdrawn and the wheel and the button return to their previous positions under the action of spring 173.

Figure 10:
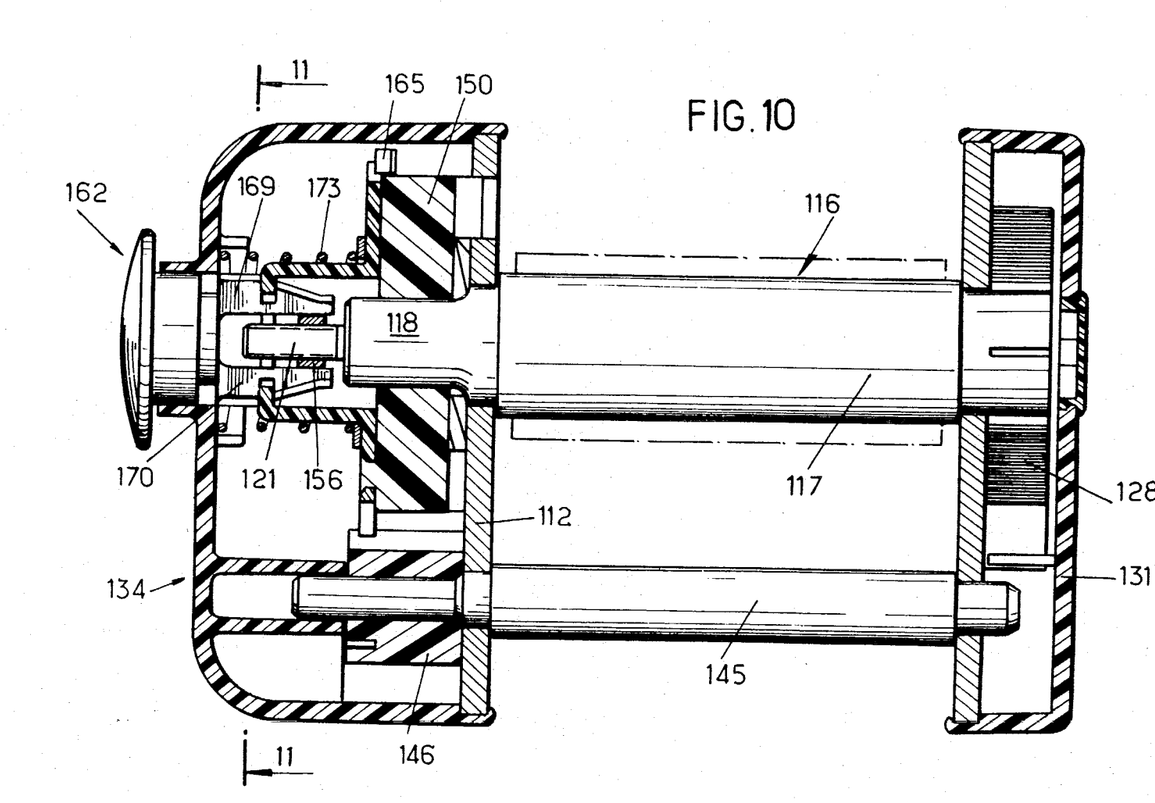
FIG. 10 is a view similar to FIG. 7, which shows another position of the device.

When, in another mode of use, it is desired to make the device operative both for strap winding and unwinding, after drawing out a certain length thereof, it suffices to prevent wheel 150 from rotating in the direction corresponding to strap winding as, by its design, the device prevents the strap from paying out. In order to do so — knob 162 being in its axial position as represented in FIG. 10 — the guide marks on head 162a are brought opposite the index marks 181 and 181a of housing 134 by turning said knob about axis 135 of the device; the enlarged portions of legs 169 and 170 are then in the position shown in dotted lines on FIG. 11. This rotary movement, limited by the abutement of legs 169 and 170 with ribs 174 and 175, causes the edges of said legs opposite groove 162c to cooperate with the wall 160 instead of with portions 183 and 184 of the orifice of sleeve 161, thus preventing any axial displacement of wheel 150 because of the cancelling or reduction of the play corresponding to the height of the teeth; the teeth 154 of wheel 150 cannot escape from the teeth 141 of flange 112 and the device is locked, preventing both winding and unwinding.

The embodiments of the invention in which an exclusive property or privilege is claimed are defined as follows:

1. A strap reeling device comprising a frame, a shaft rotatably mounted on said frame, a strap having one extremity attached to said shaft, a biasing spring arranged to bias said shaft in a direction to reel-in said strap, a wheel slidably mounted on said shaft and rotatable therewith, locking teeth on said wheel, matching locking teeth on said frame disposed for engagement by the locking teeth on said wheel, a dog pivotally mounted on said frame and normally interposed between said wheel and frame so as to prevent engagement between said locking teeth on said wheel and said matching locking teeth on said frame thereby to accommodate predetermined reeling out of said strap from an initial wound condition, biasing means reacting between said frame and said wheel and arranged to urge said wheel in an axial direction toward said frame in such manner as to urge said locking teeth toward locking engagement with said matching locking teeth, and camming means on said wheel engageable with said dog and operable to move said dog from its normal position between said wheel and frame thereby to cause engagement of said locking teeth with said matching teeth and to effect locking of said shaft against reeling out in coordination with predetermined rotation of said wheel in its reel-in direction by said biasing spring following reeling out of a predetermined portion of said strap and relaxation of reel-out tension therein.

2. A device according to claim 1 wherein a nut is threadedly related with said shaft and engageable with a part of said wheel and wherein holding means is mounted on said frame and in sliding engagement with said nut to prevent rotation thereof relative to said frame so that rotation of said shaft imparts axial movement to said nut and renders said biasing means effective to move said wheel axially relative to said shaft in coordination with movement of said dog from its normal position between said wheel and frame.

3. A device according to claim 1 wherein a manually operable knob is slidably mounted on said frame and wherein said wheel is rotatable relative to said knob and wherein said knob is secured against axial movement relative to said wheel.

4. A device according to claim 3 wherein said knob is rotatable relative to said frame.

5. A device according to claim 4 wherein said wheel includes a cap and wherein said knob comprises at least one leg having a transverse notch for receiving a part of said cap.

6. A device according to claim 5 wherein said cap comprises a base including peripheral camming elements arranged to cooperate with said dog.

7. A device according to claim 6 wherein said knob includes two legs having enlarged portions adapted to slide in a flange of a collar integral with the frame, the opening of the flange on the inner face of the collar having a shape whose cross section matches that of said enlarged portions.

8. A device according to claim 7 wherein said enlarged portions are adapted to cooperate with a wall of said collar to prevent an axial displacement of said wheel, and thus the rotation of the latter in a direction corresponding to a reeling in of the strap, abutments with which cooperate said enlarged portions being provided in the inner face of the collar for positioning the latter in a first position allowing the translation of the knob or in a second position preventing said translation.

* * * * *